No. 678,514. Patented July 16, 1901.
E. S. REGNIER.
VEGETABLE, FRUIT, OR OTHER SLICE, AND METHOD OF MAKING SAME.
(Application filed Oct. 11, 1900.)
(No Model.) 2 Sheets—Sheet 1.
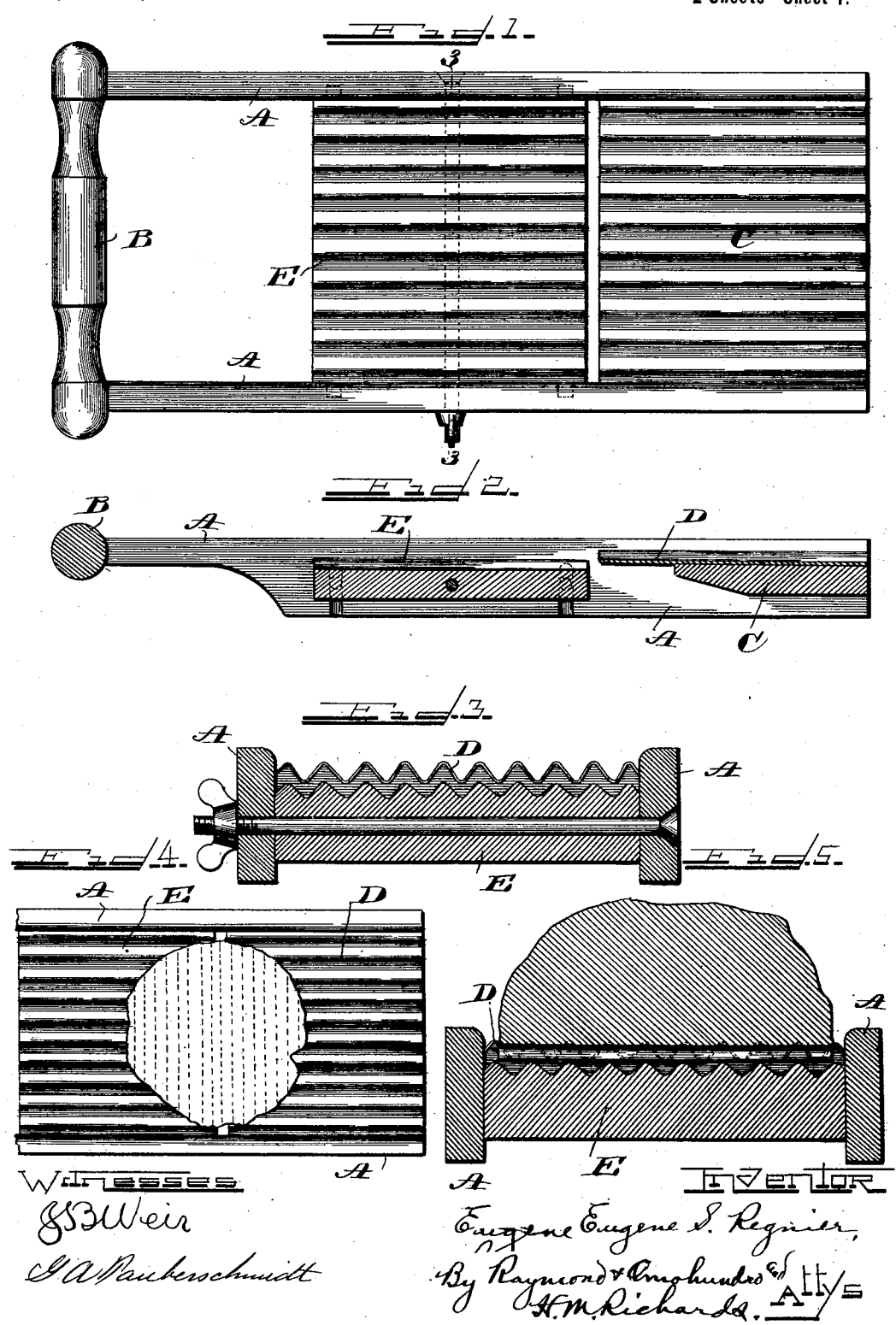

No. 678,514. Patented July 16, 1901.
E. S. REGNIER.
VEGETABLE, FRUIT, OR OTHER SLICE, AND METHOD OF MAKING SAME.
(Application filed Oct. 11, 1900.)
(No Model.) 2 Sheets—Sheet 2.
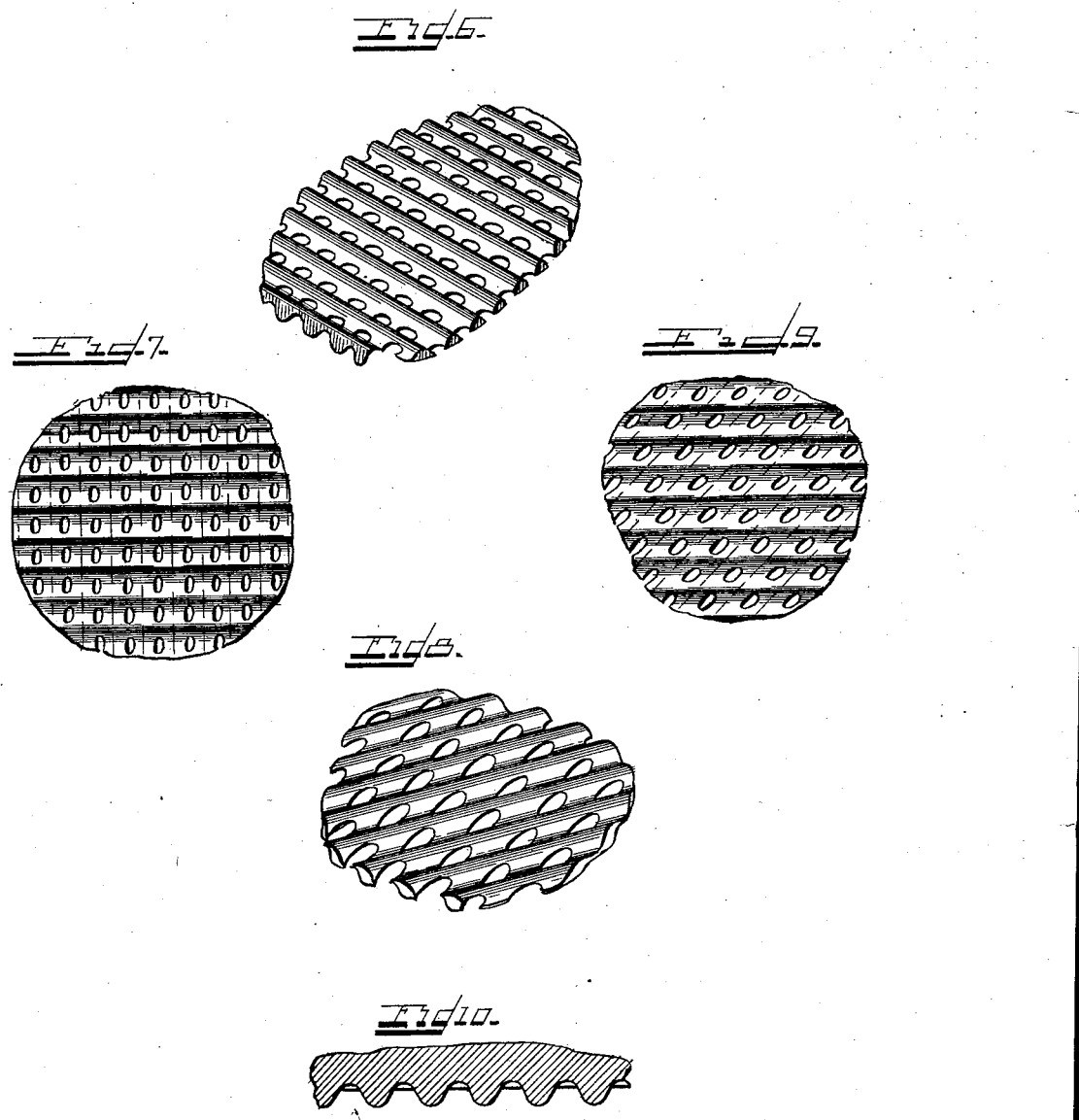

UNITED STATES PATENT OFFICE.

EUGENE S. REGNIER, OF GALESBURG, ILLINOIS, ASSIGNOR OF ONE-HALF TO LOUISA M. RICHARDS, OF SAME PLACE.

VEGETABLE, FRUIT, OR OTHER SLICE AND METHOD OF MAKING SAME.

SPECIFICATION forming part of Letters Patent No. 678,514, dated July 16, 1901.

Application filed October 11, 1900. Serial No. 32,714. (No model.)

*To all whom it may concern:*

Be it known that I, EUGENE S. REGNIER, a citizen of the United States, residing at Galesburg, in the county of Knox and State of Illinois, have invented certain new and useful Improvements in Vegetable, Fruit, or other Slices and Methods of Making Same, of which the following is a specification.

This invention relates to improvements in vegetable, fruit, and other slices and the method of making the same, and has for its primary object the production of a slice that will be ornamental in appearance, that will expose the maximum superficial area, that will not "mat" while cooking or drying, and which produces a product novel both in shape and appearance, as well as in other characteristics.

In the drawings I have shown an apparatus for producing the slices and also views of the product resulting from the practice of my method for a clear understanding of my invention.

Figure 1 represents a plan view of a slicer adapted for carrying out my method and producing my new product. Fig. 2 is a central longitudinal section thereof. Fig. 3 is a transverse vertical section on the line 3 3 of Fig. 1. Fig. 4 is a plan view illustrating the use of the apparatus. Fig. 5 is a section thereof. Fig. 6 is a perspective view of a slice produced by my apparatus. Fig. 7 is a plan view thereof. Fig. 8 is a perspective view of another slice having different-shaped openings therein from that shown in Fig. 6. Fig. 9 is a plan view thereof; and Figs. 10 and 11 are details.

Similar letters of reference indicate the same parts in the several figures of the drawings.

Referring first to the apparatus, A indicates the side bars, and B the handle connecting the same at one end. The opposite ends of the bars are permanently connected by a rigid cutter-board C, which is preferably covered with a steel cutter D, which projects beyond the forward edge of the cutter-board, as clearly shown in Fig. 2. The top of the cutter-board and, of course, the steel covering-plate are corrugated, as shown more clearly in Fig. 3. Forward of the cutter-board and substantially in line therewith is a guide-board E, which is preferably pivoted between the side bars A, although it may be permanently set, if desired. The upper surface of the guide-board is also corrugated, the corrugations being arranged parallel with those of the cutter, so that when a vegetable is forced against the front edge of the cutter a slice will be cut of thickness and shape represented by the space between the guide-board and the cutters, as clearly shown in Fig. 3. In other words, the slice will be corrugated, and the bottom face of the vegetable which slides upon the top of the cutter will also be corrugated to fit the corrugations of the cutter, and, of course, all the corrugations will extend parallel across the surface of the vegetable. If now the vegetable be rotated upon an axis perpendicular to the cutter when moved back upon the guide-board and again advanced to the cutter, the next slice will have corrugations extending across one face thereof at an angle to the corrugations in the under face thereof depending upon the degree of rotation given to the vegetable after the first cut. The perforations in the slice are due to the fact that the corrugations in its opposite sides intersect—that is to say, the grooves in each side of the slice extend beyond the medium line—or, in other words, to a depth more than one-half of the distance between the crowns of the ridges on the opposite sides of the slice, and this in turn is due to the fact that the cutting edge of the cutter and the projected working surface of the guide-board at their point of nearest approach are separated by a space which does not exceed one-half the depth of the corrugations. If they are separated by a greater space, the result will be a slice corrugated on opposite sides, but without perforations, and if they are not separated by any space the result will be strips if the plain surface of the guide-board is uppermost and the plane of its projected working surface intersects the cutting edge of the cutter.

In the apparatus shown in the drawings the guide-board is reversible—that is to say, one face thereof is corrugated and the other plane—and while the perforated slices may be made with either face up the best results and the easiest manipulation will be obtained by the use of the plane face, which, of course, is adjustable in the same way as the corrugated face would be. It will thus be seen that if the vegetable has been corrugated by a preliminary cut on its under face, as shown by the dotted lines in Figs. 4 and 7, and the vegetable is then rotated a quarter-turn before it is next run over the cutter, so that the corrugations on the under side thereof will lie at substantially a right angle to the corrugations in the cutter, a slice like that shown in Fig. 6, with substantially round perforations therein, will be produced; but if the vegetable is turned less than a quarter to any intermediate angle—say to forty-five degrees, as shown in Fig. 9—the dotted lines indicating the direction of the corrugations in the under face of the slice, the slice produced will be substantially that shown in Fig. 8, with the corrugations on opposite sides running oblique to each other and the holes or perforations in the slice elongated. Of course an endless variety of shapes of openings and relative disposition of the corrugations on opposite sides of the slice may be produced by varying the degree of rotation of the vegetable after each subjection thereof to the action of the cutter.

By my invention I produce an entirely new product, which is novel, ornamental, and useful, which will not pack nor mat with other slices, which may be used for making salads from vegetables or fruits or making Saratoga chips from potatoes, giving to the slice a very large area for the action of the hot grease, which makes a very crisp chip. This result is also brought about without wasting any of the material, because the material cut out of the holes in each slice simply forms a part of the next slice cut and is not cut out and wasted.

Having described my invention, what I claim, and desire to secure by Letters Patent, is—

1. The method of making perforated vegetable or other slices which consists in cutting in the opposite sides of the slice intersecting corrugations, the corrugations in one side being disposed at an angle to the corrugations in the other, substantially as described.

2. The method of making perforated vegetable or other slices which consists in successively subjecting the vegetable to the action of a corrugated cutter and partially rotating the vegetable about an axis perpendicular to the general plane of said cutter after each cutting operation, whereby successive slices are produced, said slices having in their opposite sides intersecting corrugations disposed at an angle to each other, substantially as described.

3. The method of making corrugated vegetable or other slices which consists in first subjecting the vegetable to the action of a corrugated cutter, whereby the face of the vegetable is corrugated, then partially rotating the vegetable about an axis perpendicular to the general plane of its corrugated face and then again subjecting the vegetable to the action of the cutter and thereby producing a slice having in its opposite sides intersecting corrugations resulting in perforations, substantially as described.

4. As a new product, a vegetable or fruit slice having corrugations or flutes in the opposite faces thereof extending at an angle to each other, said corrugations intersecting each other, so as to form perforations in the slices, substantially as described.

EUGENE S. REGNIER.

Witnesses:
HATTIE HOLCOMB MAIR,
C. S. RICHARDS.